(12) United States Patent
Klingenbrunn et al.

(10) Patent No.: US 9,131,418 B2
(45) Date of Patent: Sep. 8, 2015

(54) READING AND CACHING OF SYSTEM INFORMATION TO REDUCE CALL SETUP DELAY

(75) Inventors: Thomas Klingenbrunn, San Diego, CA (US); Shyamal Ramachandran, San Diego, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 13/025,767

(22) Filed: Feb. 11, 2011

(65) Prior Publication Data

US 2011/0199950 A1  Aug. 18, 2011

Related U.S. Application Data

(60) Provisional application No. 61/304,258, filed on Feb. 12, 2010.

(51) Int. Cl.
*H04W 36/14* (2009.01)
*H04W 36/00* (2009.01)
*H04W 48/08* (2009.01)

(52) U.S. Cl.
CPC .......... *H04W 36/14* (2013.01); *H04W 36/0066* (2013.01); *H04W 48/08* (2013.01)

(58) Field of Classification Search
CPC ...... H04W 28/00; H04W 36/00; H04W 52/00
USPC ........................... 370/311, 328–338; 455/436
See application file for complete search history.

(56) References Cited

U.S. PATENT DOCUMENTS

| | | | |
|---|---|---|---|
| 8,135,405 B2 | 3/2012 | Mittal et al. | |
| 2006/0276190 A1* | 12/2006 | Shaheen | 455/436 |
| 2010/0008324 A1 | 1/2010 | Lee et al. | |
| 2010/0113024 A1* | 5/2010 | Wu | 455/436 |
| 2011/0105119 A1* | 5/2011 | Bienas et al. | 455/436 |

FOREIGN PATENT DOCUMENTS

| | | |
|---|---|---|
| GB | 2352586 A | 1/2001 |
| JP | 2003500950 A | 1/2003 |
| JP | 2008066892 A | 3/2008 |

(Continued)

OTHER PUBLICATIONS

International Search Report and Written Opinion—PCT/US2011/024785—ISA/EPO—May 24, 2011.

(Continued)

*Primary Examiner* — Andrew Lai
*Assistant Examiner* — Sumitra Ganguly
(74) *Attorney, Agent, or Firm* — Anthony R. Morris

(57) ABSTRACT

Techniques for reading and caching system information of non-serving systems in order to shorten call setup delay are described. A user equipment (UE) may communicate with a serving system, e.g., in an idle mode or a connected mode. The UE may periodically read system information of at least one non-serving system, e.g., as a background task. The UE may cache (i.e., store) the system information of the at least one non-serving system at the UE. The UE may thereafter access a particular non-serving system among the at least one non-serving system based on access parameters in the cached system information. By caching the system information, the UE can avoid reading the system information of the particular non-serving system at the time of system access, which may then reduce call setup delay.

31 Claims, 5 Drawing Sheets

(56) References Cited

FOREIGN PATENT DOCUMENTS

| TW | M371361 U | 12/2009 |
|---|---|---|
| WO | 0072609 | 11/2000 |
| WO | 2008027946 A2 | 3/2008 |
| WO | 2008040448 A1 | 4/2008 |
| WO | 2008114137 A2 | 9/2008 |
| WO | 2008148432 A1 | 12/2008 |
| WO | 2009000298 A1 | 12/2008 |
| WO | 2009116691 A1 | 9/2009 |

OTHER PUBLICATIONS

3GPP: "3rd Generation Partnership Project; Technical Specification Group Radio Access Network; Radio Resource Control (RRC); Protocol Specification (Release 8)", 3GPP TS 25.331 v8.9.0, Dec. 2009, Parts 10.3.8.4i, 13.4.32, 13.5.1, 14.6.1, 14.12.0a, B.3.2.6, B.3.2.7, B.3.3, B.3.3.2, B.3.5, B.4, B.5 and B.6.1.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 9), 3GPP TS 36.300 V9.2.0, Dec. 2009, pp. 66-68.

Research in Motion Ltd: "CS Fallback improvements for Release 9", 3GPP TSG-RAN WG2#66bis, R2-093730, Jul. 3, 2009.

Research in Motion UK Limited: "Analysis of CS Fallback delay improvements", 3GPP TSG-RAN WG2#67, R2-094284, Aug. 28, 2009.

Taiwan Search Report—TW100104800—TIPO—Nov. 12, 2013.

* cited by examiner

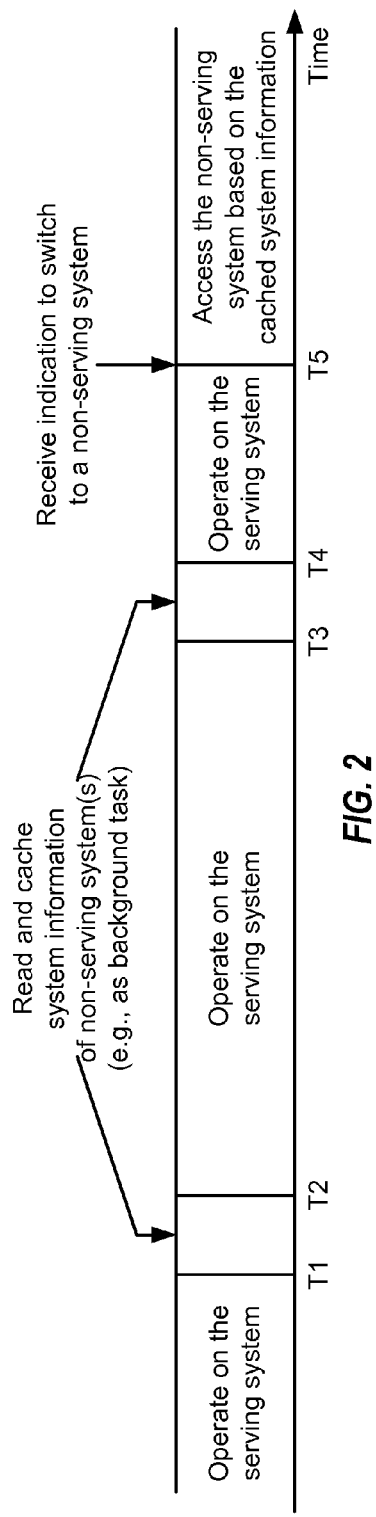
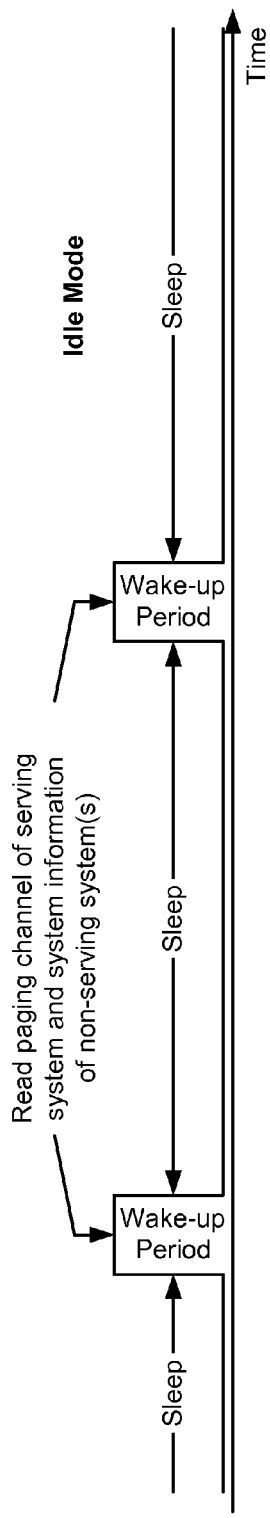
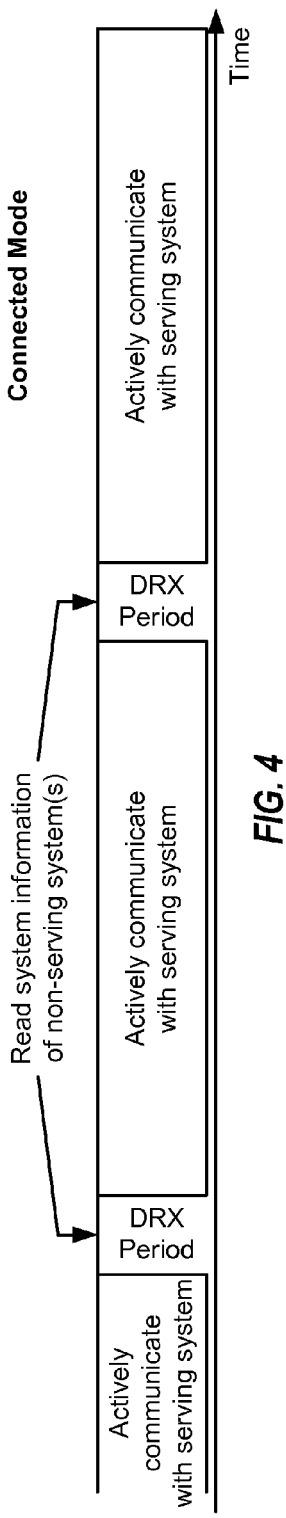
FIG. 2
FIG. 3
FIG. 4

READING AND CACHING OF SYSTEM INFORMATION TO REDUCE CALL SETUP DELAY

The present application claims priority to provisional U.S. Application Ser. No. 61/304,258, entitled "Method for Offline Reading and Caching of System Information to Reduce Call Setup Delay," filed Feb. 12, 2010, assigned to the assignee hereof and incorporated herein by reference.

BACKGROUND

I. Field

The present disclosure relates generally to communication, and more specifically to techniques for accessing wireless communication systems.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be located within the coverage of multiple wireless systems, which may have different capabilities and/or provide different communication services. The UE may access one of the wireless systems in order to obtain communication services. To access a wireless system, the UE may need to receive system information from the wireless system, obtain pertinent access parameters from the system information, and perform an access procedure based on the access parameters. This entire process may be relatively lengthy, which may then result in a long call setup delay. It may be desirable to reduce call setup delay in order to provide better user experience.

SUMMARY

Techniques for reading and caching system information of non-serving systems in order to shorten call setup delay are described herein. A UE may operate on a serving system and may periodically read system information of at least one non-serving system, e.g., as a background task. The UE may then have access parameters, if and when needed, to access a non-serving system. This may avoid the need for the UE to read the system information of the non-serving system at the time of system access, which may then reduce call setup delay.

In one design, the UE may communicate with the serving system, e.g., in an idle mode or a connected mode. The UE may read system information of at least one non-serving system, e.g., during wake-up periods when the UE is camped on the serving system in the idle mode or during tune-away periods when the UE is actively communicating with the serving system in the connected mode. The UE may cache (i.e., store) the system information of the at least one non-serving system at the UE. The UE may thereafter access a non-serving system among the at least one non-serving system based on the cached system information.

The serving and non-serving systems may be any wireless systems having any capabilities and providing any communication services. In one design, the serving system may support only packet switched (PS) services, and the non-serving system(s) may support circuit switched (CS) services. In one design, the UE may receive a connection release with redirection command for CS fallback and may then initiate access to the non-serving system in response to this command. The UE may also initiate access to the non-serving system in response to other triggering events.

Various aspects and features of the disclosure are described in further detail below.

BRIEF DESCRIPTION OF THE DRAWINGS

FIG. 2 shows system access based on cached system information.

FIG. 3 shows system information reading by a UE in the idle mode.

FIG. 4 shows system information reading by a UE in the connected mode.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio access technology (RAT) such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. IS-2000 is also referred to as 1X Radio Transmission Technology (1xRTT), CDMA2000 1X, etc. A TDMA system may implement a RAT such as Global System for Mobile Communications (GSM), Enhanced Data rates for GSM Evolution (EDGE), etc. An OFDMA system may implement a RAT such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless systems and RATs mentioned above as well as other wireless systems and RATs. For clarity, certain aspects of the techniques are described below for LTE.

Figure 1:
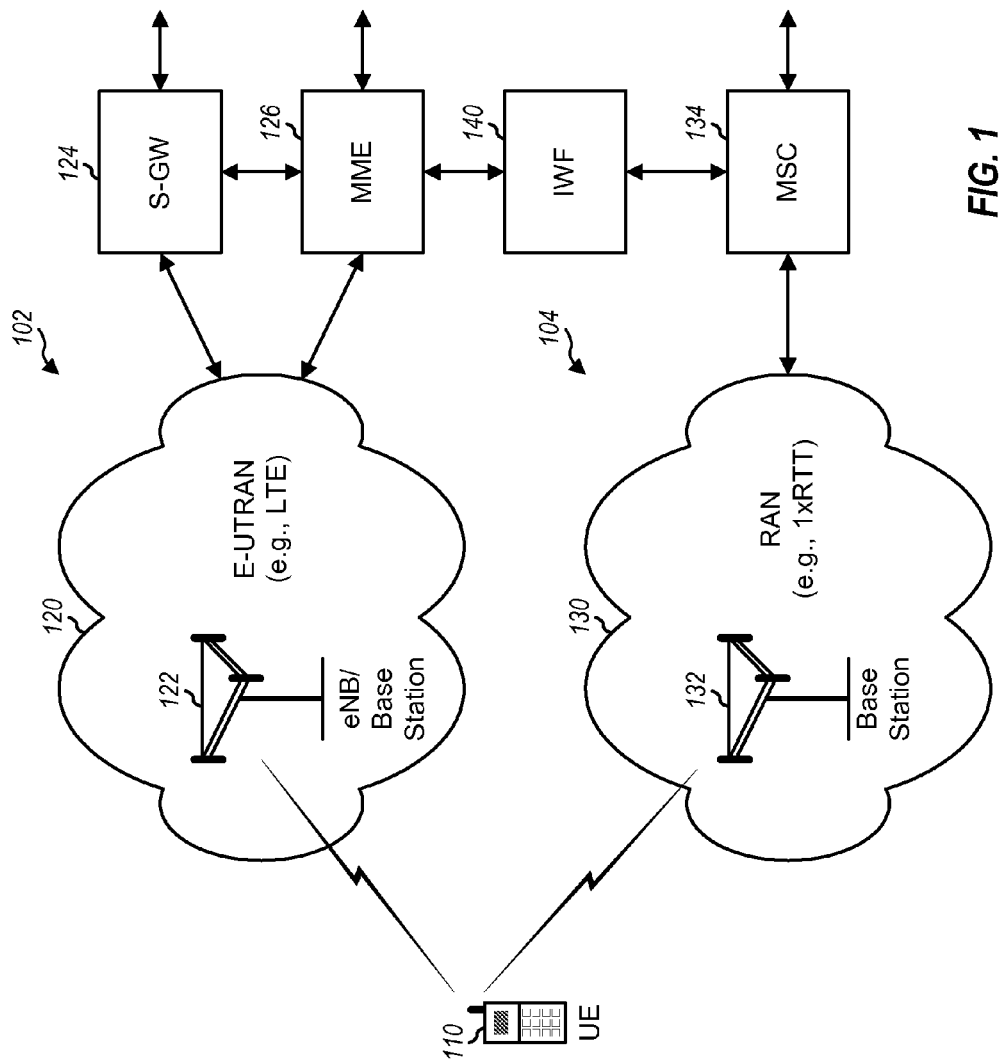
FIG. 1 shows a deployment of multiple wireless communication systems.

FIG. 1 shows an exemplary deployment in which multiple wireless communication systems have overlapping coverage. A first wireless system 102 (e.g., an LTE system) may include an Evolved Universal Terrestrial Radio Access Network (E-UTRAN) 120, a Serving Gateway (S-GW) 124, and a Mobility Management Entity (MME) 126. A second wireless system 104 (e.g., a UMTS, 1xRTT, or GSM system) may include a Radio Access Network (RAN) 130 and a Mobile Switching Center (MSC) 134.

E-UTRAN 120 may support a first RAT (e.g., LTE) and may include a number of Evolved Node Bs (eNBs) 122 and other network entities that can support wireless communication for UEs. Each eNB may be a base station providing communication coverage for a particular geographic area. The term "cell" can refer to a coverage area of an eNB and/or an eNB subsystem serving this coverage area. Serving Gateway 124 may communicate with E-UTRAN 120 and may perform various functions such as packet routing and forwarding, mobility anchoring, packet buffering, initiation of network triggered services, etc. MME 126 may communicate with E-UTRAN 120 and Serving Gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

RAN 130 may support a second RAT (e.g., WCDMA, 1xRTT, GSM/EDGE, etc.) and may include a number of base stations 132 and other network entities that can support wireless communication for UEs. MSC 134 may communicate with RAN 130 and may support voice services, provide routing for circuit-switched calls, and perform mobility management for UEs located within the area served by MSC 134. An Inter-Working Function (IWF) 140 may facilitate communication between MME 126 and MSC 134. The network entities in UMTS and GSM are described in publicly available documents from 3GPP. The network entities in 1xRTT are described in publicly available documents from 3GPP2.

For simplicity, FIG. 1 shows only some network entities in wireless systems 102 and 104. Wireless systems 102 and 104 may also include other network entities that may support various functions and services. In general, any number of wireless systems may be deployed in a given geographic area. Each wireless system may support a particular RAT and may operate on one or more frequencies. A frequency may also be referred to as a carrier, a frequency channel, etc.

A number of UEs may be dispersed throughout the coverage of wireless systems 102 and 104. For simplicity, only one UE 110 is shown in FIG. 1. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

Upon power up, UE 110 may search for wireless systems from which it can receive communication services. If multiple wireless systems are detected, then one wireless system (e.g., the wireless system with the highest priority) may be selected to serve UE 110. UE 110 may access the selected wireless system and perform registration, if necessary. The wireless system serving UE 110 may be referred to as a serving system, and the remaining systems may be referred to as non-serving systems. UE 110 may operate in a connected mode to actively communicate with (e.g., send data to and/or receive data from) the serving system. Alternatively, UE 110 may operate in an idle mode and camp on the serving system if active communication is not required by UE 110. UE 110 may periodically read a paging channel and/or a broadcast channel of the serving system and/or perform other tasks while camped on the serving system. UE 110 may thus communicate with the serving system in different manners in different operating modes.

A wireless system may periodically transmit system information to convey various parameters used to support operation by UEs on the wireless system. Different wireless systems may transmit system information in different manners.

In a LTE system, system information may be partitioned into a master information block (MIB) and a number of system information blocks (SIBs) to enable efficient transmission and reception of the system information. The MIB may include a limited number of essential parameters used to acquire other information from an eNB/base station. K SIBs may be defined and may be referred to as system information block types 1 through K, or SIB1 through SIBK. In general, K may be any integer value, e.g., K=11 for LTE Release 8. Each SIB may carry a specific set of parameters to support operation by UEs. SIB1 may carry scheduling information for system information (SI) messages as well as a mapping of SIBs to SI messages. The MIB may be transmitted periodically with a fixed schedule of 40 milliseconds (ms). SIB1 may be transmitted with a periodicity of 80 ms. Each remaining SIB may be transmitted with a periodicity indicated by the scheduling information in SIB1.

Different wireless systems may have different capabilities and may support different communication services. For example, some wireless systems such as LTE systems may support only packet switched (PS) services and may not support circuit switched (CS) services. For PS-only capable systems that do not support CS services, several mechanisms have been standardized to allow a UE to "fallback" to a CS-capable system and are commonly referred to as CS fallback (CSFB) mechanisms. In one CSFB mechanism, a PS-only capable RAN may issue a connection release with redirection command to a UE. The UE is then required to disconnect from the PS-only capable RAN and initiate an access procedure to a CS-capable RAN. Prior to initiating the access procedure, the UE is required to read a broadcast channel of the CS-capable RAN in order to receive system information and obtain access parameters, which provide pertinent information for performing the access procedure. Unless the system information is provided "tunneled" along with the redirection command (which may not be supported by the UE or the CS-capable RAN), the UE will have to tune its radio to the broadcast channel of the CS-capable RAN to receive the system information. However, the CS-capable RAN may only periodically transmit the system information (typically up to seconds apart). The UE would then need some amount of time to receive the system information of the CS-capable RAN, which may then delay access to the CS-capable RAN.

Reading the system information of the CS-capable RAN after receiving the connection release with redirection command may result in a longer call setup delay as compared to a case in which the UE is camped on the CS-capable RAN and continually reads the system information and hence always has the latest access parameters ready. The end user experience would be degraded due to the longer call setup delay.

This may be particularly problematic when deploying PS-only capable RANs (e.g., E-UTRANs), because the end users may not be willing to accept a degradation in call setup delay as compared to existing RANs (e.g., second generation (2G) and third generation (3G) RANs).

In an aspect, a UE may operate on a serving system (e.g., a PS-only capable system) and may periodically read system information of one or more non-serving systems, e.g., as a background task. The UE may then have access parameters, if and when needed, to access a non-serving system. This may reduce call setup delay when the UE is directed to the non-serving system.

Access to a wireless system may refer to a UE sending a request to a wireless system to establish a connection for the purpose of exchanging signaling (e.g., to set up a CS or PS call, to update registration information, etc.) and/or user data between the UE and the wireless system. However, access may also refer to the UE silently camping on the wireless system (e.g., receiving broadcast signaling from the wireless system, but not sending anything back to the wireless system if it is not needed). The UE may perform access to the wireless system based on one or more access parameters, which may be obtained from system information broadcast by the wireless system. For example, the access parameters may indicate which access channel and/or resources to use to send an access request, the transmit power level to use for the access request, etc. The access parameters may also indicate an interference level on the wireless system for helping random access procedure, cell selection parameters to allow access to a cell only when conditions are suitable, access restrictions such as access class barring, etc. Different wireless systems may be associated with different sets of access parameters, which may be provided by the system information broadcast by these wireless systems.

FIG. 2 shows a design of reading system information of a non-serving system and accessing the non-serving system based on cached system information. UE 110 may initially operate on a serving system (e.g., a PS-only capable system such as a LTE system). UE 110 may read system information of one or more non-serving systems (e.g., a CS-capable system) between time T1 and time T2. In one design, UE 110 may read the system information of the non-serving system(s) as a background task, without interrupting communication with the serving system. In another design, UE 110 may momentarily interrupt communication with the serving system in order to read the system information of the non-serving system(s) and may thereafter resume communication with the serving system. For both designs, UE 110 may cache the system information of the non-serving system(s) so that it is readily available if and when needed to access any one of the non-serving system(s).

UE 110 may periodically read the system information of the non-serving system(s) and may do so again between time T3 and time T4. UE 110 may update the cached system information for the non-serving system(s) after each reading of the system information from the non-serving system(s).

UE 110 may receive an indication to switch from the current serving system to a particular non-serving system at time T5. UE 110 may then access the non-serving system based on the system information cached by UE 110 for the non-serving system. This may result in a shorter call setup delay.

UE 110 may read the system information of non-serving systems in various manners. In one design, UE 110 may autonomously scan for surrounding wireless systems and may read system information of detected wireless systems. In another design, UE 110 may receive neighbor information broadcast by the serving system and may read system information of non-serving systems identified by the neighbor information. For both designs, UE 110 may occasionally read the system information of the non-serving systems (e.g., every X seconds). The time interval between system information readings may be selected such that power consumption of UE 110 is not adversely impacted and overall standby time of UE 110 remains acceptable.

UE 110 may cache the system information of the non-serving systems between readings. In one design, UE 110 may cache the system information for a particular number of neighbor cells in one or more non-serving systems. In another design, UE may cache system information for neighbor cells with sufficient signal strength, e.g., above a particular threshold. For both designs, if CSFB is triggered, then UE 110 may scan for the best available cell to which UE 110 can be handed over. This best available cell may be the strongest cell in a non-serving system detected by UE 110 or may be selected based on other criteria. If the best available cell belongs in a non-serving system cached by UE 110, then UE 110 may access this cell using the cached access parameters, thereby avoiding the delay of reading the system information at this time.

UE 110 may use the cached system information of non-serving systems in various manners. In one design, UE 110 may always attempt to access a non-serving system (e.g., when CSFB is triggered) based on the cached system information for that non-serving system, regardless of when the system information was read. In this design, if system access fails, then UE 110 may read the current system information of the non-serving system and may again attempt to access the system with the current access parameters. In another design, UE 110 may use the cached system information of a non-serving system for access only if the cached system information is valid (e.g., is not too old). For example, the cached system information may be deemed not valid (e.g., too old) if the amount of time since the last reading of the system information exceeds a particular time threshold. If the cached system information is not valid, then UE 110 may read the current system information prior to accessing the non-serving system. This design may be used to safeguard against cases in which UE 110 is not able to periodically read the system information, e.g., when UE 110 is operating in the connected mode and there are no opportunities for reading system information.

UE 110 may periodically read system information of non-serving systems in various manners. In one design, the periodicity of system information reading may be fixed and applicable all the time. The fixed periodicity may be selected based on various criteria such as the amount of time available to UE 110 for reading system information, the desired tradeoff between power consumption and call setup delay, etc.

In another design, the periodicity of system information reading may be variable and may be selected based on various criteria. In one design, the variable periodicity of system information reading may be dependent on the speed of UE 110, which may be estimated based on various metrics such as the time between cell changes, Global Positioning System (GPS) information, changes in radio conditions, motion sensors, accelerometers, and/or other sensors on UE 110, or supporting information from a wireless system, etc. In another design, the variable periodicity of system information reading may be dependent on radio conditions of candidate cells for handover, the serving cell of UE 110, etc. For example, UE 110 may perform system information reading more frequently for strong candidate cells and less frequently for weaker candidate cells. UE 110 may also perform system information reading less frequently when the serving cell is strong and more frequently when the serving cell is weaker. UE 110 may also disable system information reading for candidate cells that are weaker than a certain threshold.

UE 110 may read system information of non-serving systems while operating in the idle mode or the connected mode. UE 110 may perform system information reading in different manners and/or at different times in the idle mode and the connected mode.

FIG. 3 shows system information reading by UE 110 in the idle mode. UE 110 may operate in the idle mode when active communication with the serving system is not required. While in the idle mode, UE 110 may periodically wake up during its paging occasions (or wake-up periods) to monitor for paging and/or other messages from the serving system and may sleep during the time between the paging occasions. UE 110 may also read system information of non-serving systems during the paging occasions. Hence, system information reading may be piggybacked onto the periodic wake-up tasks of reading a paging channel and/or a broadcast channel of the serving system.

FIG. 4 shows system information reading by UE 110 in the connected mode. UE 110 may operate in the connected mode for active communication with the serving system. In the connected mode, UE 110 may be configured with discontinuous reception (DRX) periods during which data is not transmitted by the serving system to UE 110. In one design, UE 110 may read system information of non-serving systems during its DRX periods. This design may be especially applicable if UE 110 can receive only one wireless system at any given time. In another design, UE 110 may communicate with the serving system and also read system information of non-serving systems at the same time. In this design, the reading of system information of the non-serving systems may be scheduled independently of data activity on the serving system. This design may be applicable when UE 110 is capable of simultaneously receiving two wireless systems. This capability may be provided by (i) multiple receivers that can be operated independently by UE 110 or (ii) a diversity receiver in which the receive diversity path can be tuned independently by UE 110.

UE 110 may read some or all of the system information of a non-serving system. In one design, UE 110 may decide to read only certain parts of the system information (e.g., only certain SIBs) based on various factors such as how often the system information is broadcast, how likely it is that the system information has changed, how likely it is that UE 110 will receive the system information anyway once on a dedicated connection (e.g., based on past experience), and/or other factors.

UE 110 may have read the system information of a non-serving system and may have cached the system information. The cached system information may have changed since it was read by UE 110. This scenario may be addressed in various manners.

In one design, UE 110 may always decode the MIBs of candidate cells with which UE 110 might perform system access. UE 110 may then determine whether the SIBs cached by UE 110 for each candidate cell are current based on the MIB of that cell. Each version of a given SIB may be associated with a value tag that may be updated (e.g., incremented by one) whenever the system information in that SIB is changed. The MIB of a candidate cell may include the value tag of the current version of each SIB of that cell. UE 110 may determine which SIBs have changed (if any) based on their value tags. For a given SIB x that has been cached by UE 110, UE 110 may compare a value tag obtained from the MIB for the current version of SIB x with a value tag obtained from the cached version of SIB x to determine whether the cached version of SIB x is up to date. For this design, UE 110 may always read the MIBs of candidate cells prior to performing system access. However, this MIB reading may take only a short time, e.g., on the order of hundreds of milliseconds. This short MIB reading time may be much shorter than SIB reading time, which for example may be up to 1.28 seconds. UE 110 may determine the MIB schedule of the candidate cells by itself or may be informed of the MIB schedule via signaling from the serving system.

In another design, the serving system may inform UE 110 when system information of a non-serving system has changed. UE 110 may then read the system information of the non-serving system when informed by the serving system. The serving system may inform UE 110 of a change in system information of the non-serving system in various manners. In one design, a new SIB may be defined and may include notification of changes to system information of non-serving systems, which may be referred to as inter-RAT (IRAT) neighbor SIB updates ("IRAT Nbr SIB Updates"). This new SIB may be referred to as a neighbor SIB.

A SIB update procedure may indicate whenever the content of a given SIB has changed. In one design, the neighbor SIB may include indicators of all SIBs per cell per RAT (e.g., UTRAN, GERAN, etc.) to indicate that a SIB of a particular cell on a particular RAT has changed. The neighbor SIB may also include timing offsets between a serving cell reference time and a SIB transmission time on a target RAT. The use of the neighbor SIB may enable UE 110 to read system information of non-serving systems only when the neighbor SIB of the serving system indicates that the system information of the non-serving systems has changed. UE 110 may then avoid periodic tune-away from the serving system to read the system information of the non-serving systems.

The techniques described herein may substantially reduce call setup delay for system access. This may be achieved through periodic reading of system information of non-serving systems (e.g., off-line as a background task) and caching the system information at UE 110. UE 110 may then perform system access using access parameters in the cached system information, which may avoid the delay of having to read the system information when system access is triggered. The techniques described herein may be used for system access due to various reasons and may be especially applicable for CSFB triggered by a connection release with redirection command.

Figure 5:
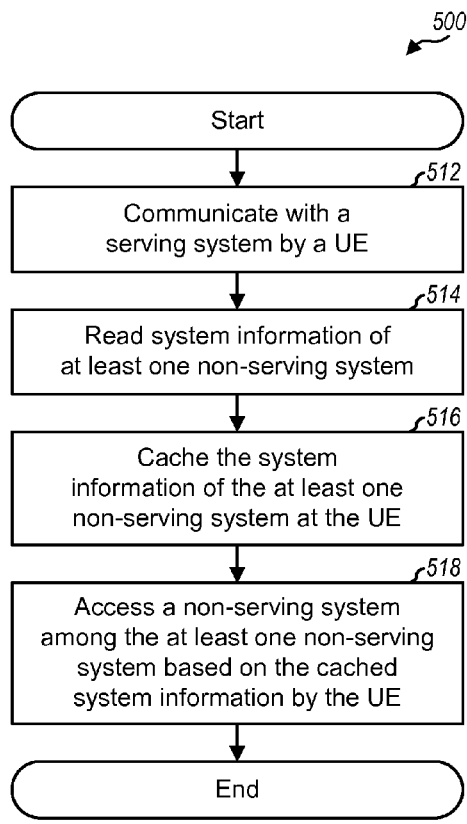
FIG. 5 shows a process for performing system access based on cached system information.

FIG. 5 shows a design of a process 500 for performing system access based on cached system information. Process 500 may be performed by a UE (as described below) or by some other entity. The UE may communicate with a serving system (block 512). The UE may read system information of at least one non-serving system (block 514) and may cache (i.e., store) the system information of the at least one non-serving system at the UE (block 516). The UE may thereafter access a non-serving system among the at least one non-serving system based on the cached system information (block 518).

The serving and non-serving systems may be any wireless systems having any capabilities and providing any communication services. In one design, the serving system may support only PS services, and the at least one non-serving system may support CS services. In one design, the UE may receive a connection release with redirection command for CS fallback and may then initiate access to the non-serving system in response to this command. The UE may skip reading system information of the non-serving system after receiving this command. In other designs, the UE may initiate access to the non-serving system in response to other triggering events.

In one design, the UE may read the system information of the at least one non-serving system at a fixed periodicity, which may be configured at the UE or provided by the serving system. In another design, the UE may read the system information of the at least one non-serving system at a configurable periodicity. The UE may determine the periodicity of system information reading for the at least one non-serving system based on the speed of the UE, or radio conditions of cells in the non-serving system(s), or a target standby time of the UE, or some other criteria, or a combination thereof.

In one design, the UE may operate in the idle mode and may camp on the serving system in block 512. The UE may read the system information of the non-serving system(s) during wake-up periods in block 514, as shown in FIG. 3. In another design, the UE may operate in the connected mode and may actively communicate with (e.g., send data to and/or receive data from) the serving system in block 512. The UE may receive the system information of the non-serving system(s) during DRX periods in block 514, as shown in FIG. 4. The UE may also periodically tune away from the serving system to read the system information of the non-serving system(s) in block 514. The UE may also read the system information of the non-serving system(s) based on a separate receive path, without having to interrupt active communication with the serving system.

In one design, the UE may read the system information of the non-serving system(s) as a background task. The UE may also read the system information of a predetermined number of neighbor cells in the non-serving system(s), or neighbor cells with signal strength above a particular threshold at the UE, or neighbor cells selected in other manners.

In one design, the UE may determine whether the cached system information is valid, e.g., when an indication to access the non-serving system is obtained by the UE. The UE may determine that the cached system information is (i) valid if the elapsed time since the last reading of the system information is less than a particular threshold or (ii) not valid otherwise. The UE may also determine whether the cached system information is valid based on other criteria. The UE may use the cached system information for assessing the non-serving system if it is valid. The UE may read the current system information of the non-serving system and use the current system information for assessing the non-serving system if the cached system information is not valid.

In one design, the UE may read at least one MIB of at least one candidate cell in the non-serving system prior to accessing the non-serving system. The UE may determine whether the cached system information has changed based on the at least one MIB. The UE may use the cached system information to access the non-serving system if the cached system information has not changed. The UE may read the current system information of the non-serving system if the cached system information has changed.

In another design, the UE may receive from the serving system neighbor information indicative of whether the system information of the non-serving system(s) has changed. The UE may read the system information of the non-serving system(s) if the neighbor information indicates that the system information of the non-serving system(s) has changed. In another design, the UE may receive neighbor information indicative of neighbor cells in the non-serving system(s), or timing of the neighbor cells, or frequency of the neighbor cells, or at least one timing offset between a serving cell in the serving system and at least one neighbor cell in the non-serving system(s), or some other information, or a combination thereof. The UE may then read the system information of the non-serving system(s) based on the neighbor information.

In one design of block 518, the UE may determine at least one access parameter based on the cached system information and may assess the non-serving system based on the at least one access parameter. In one design of system access, the UE may detect at least one neighbor cell in the non-serving system(s) and may identify a candidate cell for access by the UE from among the at least one neighbor cell. The UE may determine whether the cached system information is applicable for the candidate cell. The UE may then access the candidate cell based on the cached system information if it is applicable for the candidate cell.

Figure 6:
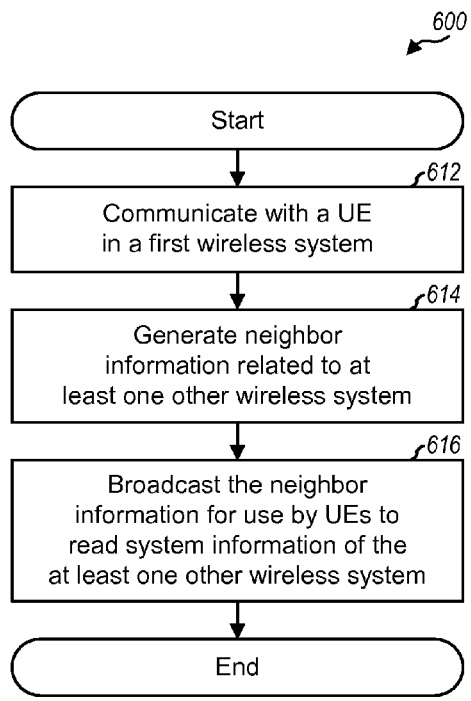
FIG. 6 shows a process for supporting reading of system information of non-serving systems.

FIG. 6 shows a design of a process 600 for supporting reading of system information of non-serving systems by UEs. Process 600 may be performed by a first cell in a first wireless system (as described below) or by some other entity. The first cell may communicate with a UE (block 612). The first cell may generate neighbor information related to at least one other wireless system (block 614). The neighbor information may indicate whether the system information of the other wireless system(s) has changed, or neighbor cells in the other wireless system(s), or timing of the neighbor cells, or frequency of the neighbor cells, or at least one timing offset between the first cell and at least one neighbor cell, or a combination thereof. The first cell may broadcast the neighbor information, which may be used by the UE and other UEs to read system information of the other wireless system(s) (block 616).

In general, the first wireless system and the other wireless system(s) may have any capabilities and may support any communication services. In one design, the first wireless system may support only PS services, and the other wireless system(s) may support CS services.

Figure 7:
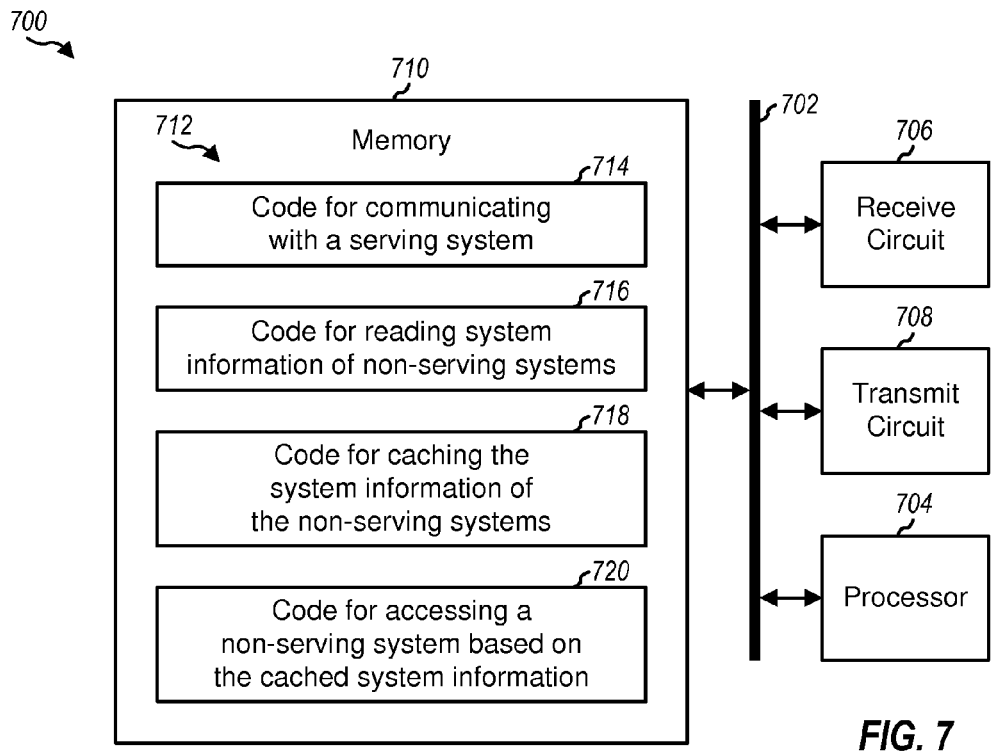
FIG. 7 shows an apparatus for receiving and caching system information.

FIG. 7 shows part of a hardware implementation of an apparatus 700 supporting wireless communication. Apparatus 700 includes circuitry and may be one configuration of a UE or some other entity. In this specification and the appended claims, the term "circuitry" is construed as a structural term and not as a functional term. For example, circuitry may be an aggregate of circuit components, such as a multiplicity of integrated circuit components, in the form of processing and/or memory cells, units, blocks and the like, such as shown and described in FIG. 7.

Apparatus 700 comprises a central data bus 702 linking several circuits together. The circuits include a processor 704, a receive circuit 706, a transmit circuit 708, and a memory 710. Memory 710 is in electronic communication with processor 704, so that processor 704 may read information from and/or write information to memory 710. Processor 704 may be a general purpose processor, a central processing unit (CPU), a microprocessor, a digital signal processor (DSP), a controller, a microcontroller, a state machine, an application specific integrated circuit (ASIC), a programmable logic device (PLD), a field programmable gate array (FPGA), etc. Processor 704 may include a combination of processing devices, e.g., a combination of a DSP and a microprocessor, a plurality of microprocessors, one or more microprocessors in conjunction with a DSP core, or any other such configuration.

Receive circuit 706 and transmit circuit 708 may be connected to a radio frequency (RF) circuit (not shown in FIG. 7). Receive circuit 706 may process and buffer received signals before sending the signals out to data bus 702. Transmit circuit 708 may process and buffer data from data bus 702 before sending the data out of apparatus 700. Processor 704 may perform the function of data management of data bus 702 and further the function of general data processing, including executing the instructional contents of memory 710. Transmit circuit 708 and receive circuit 706 may be external to processor 704 (as shown in FIG. 7) or may be part of processor 704.

Memory 710 stores a set of instructions 712 executable by processor 704 to implement the methods described herein. Instructions 712 may include code 714 for communicating with a serving system, code 714 for reading system information of non-serving systems, code 716 for caching the system information of the non-serving systems, and code 718 for accessing a non-serving system based on the cached system information. Instructions 712 may include other codes for other functions.

Instructions 712 shown in memory 710 may comprise any type of computer-readable statement(s). For example, instructions 712 in memory 710 may refer to one or more programs, routines, sub-routines, modules, functions, procedures, data sets, etc. Instructions 712 may comprise a single computer-readable statement or many computer-readable statements.

Memory 710 may be a RAM (Random Access Memory) circuit. Memory 710 may be tied to another memory circuit (not shown) which may either be of a volatile or a nonvolatile type. As an alternative, memory 710 may be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. Memory 710 may be considered to be an example of a computer-program product that comprises a computer-readable medium with instructions 712 stored therein.

Figure 8:
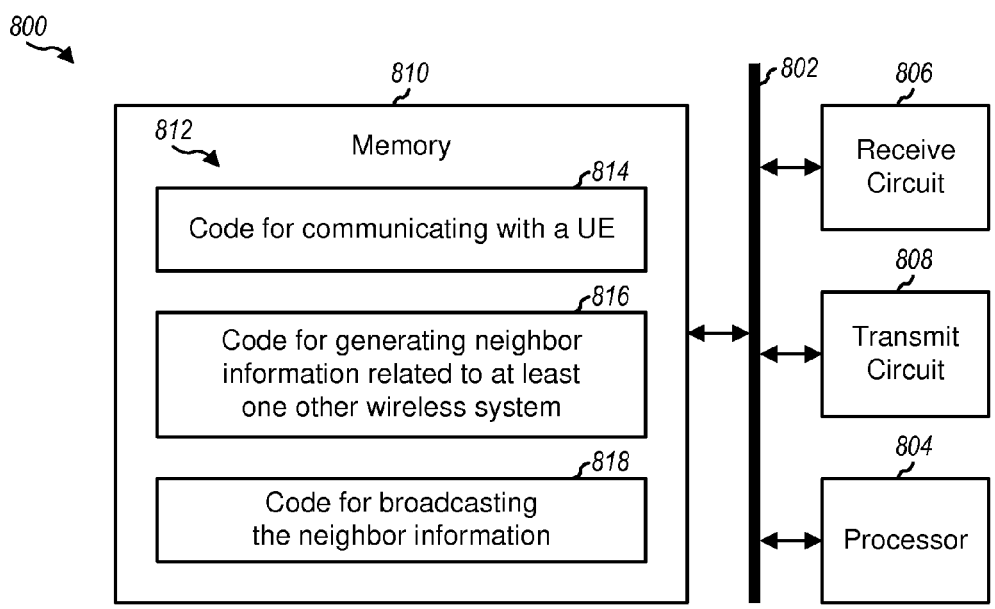
FIG. 8 shows an apparatus for supporting reading of system information of non-serving systems.

FIG. 8 shows part of a hardware implementation of an apparatus 800 supporting wireless communication. Apparatus 800 includes circuitry and may be one configuration of a base station/eNB or some other entity. Apparatus 800 comprises a central data bus 802, a processor 804, a receive circuit 806, a transmit circuit 808, and a memory 810, which may be implemented as described above for central data bus 702, processor 704, receive circuit 706, transmit circuit 708, and memory 710 in FIG. 7.

Memory 810 includes a set of instructions 812 executable by processor 804 to implement the methods described herein. Instructions 812 may include code 814 for communicating with a UE, code 816 for generating neighbor information related to at least one other wireless system, and code 818 for broadcast the neighbor information. The neighbor information may be used by the UE and other UEs to read system information of the at least one other wireless system. Instructions 812 may include other codes for other functions.

Figure 9:
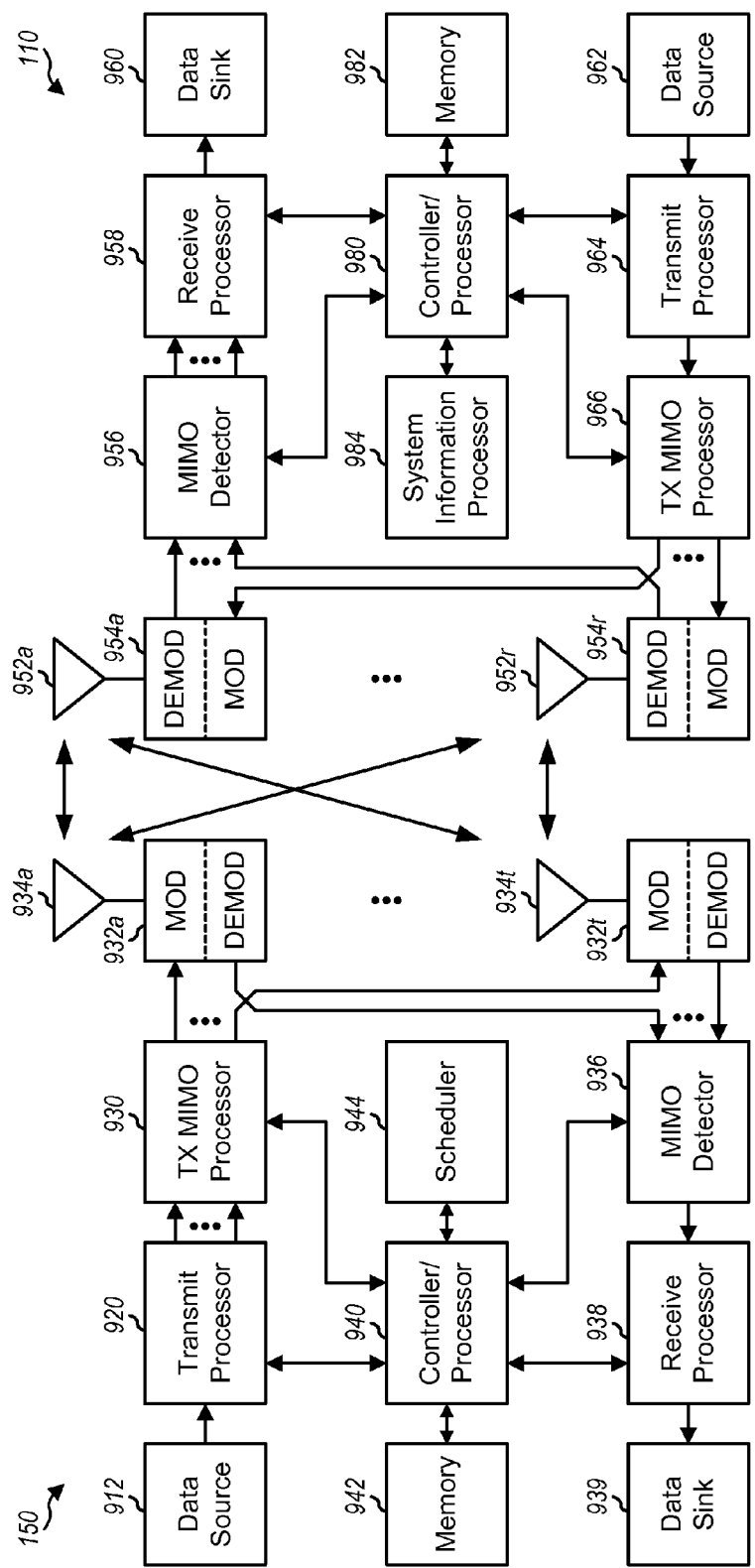
FIG. 9 shows a block diagram of a base station and a UE.

FIG. 9 shows a block diagram of a design of a base station 150 and a UE 110. Base station 150 may correspond to eNB 122 or base station 132 in FIG. 1. In this design, base station 150 is equipped with T antennas 934a through 934t, and UE 110 is equipped with R antennas 952a through 952r, where in general T≥1 and R≥1. The techniques described herein may be used with or without multiple-input multiple-output (MIMO) capabilities. An exemplary design of base station 150 and UE 110 with MIMO capabilities is described below.

At base station 150, a transmit processor 920 may receive data for one or more UEs from a data source 912, process (e.g., encode, interleave, and modulate) the data for each UE, and provide data symbols for all UEs. Transmit processor 920 may also process system information (e.g., MIB, SIBs, etc.) and control information (e.g., for access procedures) from a controller/processor 940 and provide overhead symbols. A transmit (TX) MIMO processor 930 may multiplex the data symbols, the overhead symbols, and reference symbols. TX MIMO processor 930 may perform precoding on the multiplexed symbols, if applicable, and may provide T output symbol streams to T modulators (MODs) 932a through 932t. Each modulator 932 may process a respective output symbol stream (e.g., for OFDM) to obtain an output sample stream. Each modulator 932 may further process (e.g., convert to analog, amplify, filter, and upconvert) the output sample stream to obtain a downlink signal. T downlink signals from modulators 932a through 932t may be transmitted via T antennas 934a through 934t, respectively.

At UE 110, antennas 952a through 952r may receive the downlink signals from base station 150 and other base stations and may provide received signals to demodulators (DEMODs) 954a through 954r, respectively. Each demodulator 954 may condition (e.g., filter, amplify, downconvert, and digitize) a respective received signal to obtain received samples. Each demodulator 954 may further process the received samples (e.g., for OFDM) to obtain received symbols. A MIMO detector 956 may obtain received symbols from all R demodulators 954a through 954r, perform MIMO detection on the received symbols if applicable, and provide detected symbols. A receive processor 958 may process (e.g., demodulate, deinterleaver, and decode) the detected symbols, provide decoded data for UE 110 to a data sink 960, and provide decoded system information and control information to a controller/processor 980. A system information processor 984 may perform or control reading and caching of system information of non-serving systems.

On the uplink, at UE 110, data from a data source 962 and control information (e.g., for access procedures) from controller/processor 980 may be processed by a transmit processor 964, preceded by a TX MIMO processor 966 if applicable, conditioned by modulators 954a through 954r, and transmitted to base station 150. At base station 150, the uplink signals from UE 110 and other UEs may be received by antennas 934, conditioned by demodulators 932, processed by a MIMO detector 936 if applicable, and further processed by a receive processor 938 to obtain the data and control information transmitted by UE 110 and other UEs.

Controllers/processors 940 and 980 may direct the operation at base station 150 and UE 110, respectively. Processor 940 and/or other processors and modules at base station 150 may perform or direct process 600 in FIG. 6 and/or other processes for the techniques described herein. Processor 980 and/or other processors and modules at UE 110 may perform or direct process 500 in FIG. 5 and/or other processes for the techniques described herein. Memories 942 and 982 may store data and program codes for base station 150 and UE 110, respectively. A scheduler 944 may schedule UEs for downlink and/or uplink transmission and may provide assignments of resources for the scheduled UEs.

The functions described herein may be implemented in hardware, software, firmware, or any combination thereof. If implemented in software, the functions may be stored as one or more instructions on a computer-readable medium. The term "computer-readable medium" or "computer program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
   communicating with a serving system by a user equipment;
   reading system information broadcast by at least one non-serving system prior to initiation of access to the at least one non-serving system, wherein the system information includes one or more access parameters needed by the user equipment to establish a connection with the at least one non-serving system;
   caching the system information broadcast by the at least one non-serving system at the user equipment prior to initiation of access to the at least one non-serving system;
   receiving, from the serving system, neighbor information indicative of whether the system information broadcast by the at least one non-serving system has changed, wherein reading system information comprises reading the system information broadcast by the at least one non-serving system when the neighbor information indicates that the system information of the at least one non-serving system has changed; and
   accessing a non-serving system among the at least one non-serving system using the cached system information by the user equipment.

2. The method of claim 1, wherein the serving system supports only packet switched services, and wherein the at least one non-serving system supports circuit switched services.

3. The method of claim 2, further comprising:
   receiving a connection release with redirection command for circuit switched fallback; and
   initiating access to the non-serving system in response to the connection release with redirection command.

4. The method of claim 1, wherein the reading system information comprises reading the system information broadcast by the at least one non-serving system during wake-up periods when the user equipment is in an idle mode and camping on the serving system.

5. The method of claim 1, wherein the reading system information comprises reading the system information broadcast by the at least one non-serving system during discontinuous reception periods when the user equipment is in a connected mode and actively communicating with the serving system.

6. The method of claim 1, wherein the reading system information comprises reading the system information broadcast by the at least one non-serving system based on a separate receive path by the user equipment, without interrupting communication with the serving system, when the user equipment is in a connected mode.

7. The method of claim 1, wherein the reading system information comprises reading the system information broadcast by the at least one non-serving system as a background task by the user equipment.

8. The method of claim 1, wherein the reading system information comprises reading system information broadcast by a predetermined number of neighbor cells in the at least one non-serving system, or neighbor cells with signal strength above a particular threshold at the user equipment, or both.

9. The method of claim 1, further comprising: determining a periodicity of reading the system information broadcast by the at least one non-serving system based on speed of the user equipment, or radio conditions of cells in the at least one non-serving system, or a target standby time of the user equipment, or a combination thereof.

10. The method of claim 1, further comprising: determining whether to read all or a portion of the system information broadcast by the at least one non-serving system.

11. The method of claim 1, further comprising:
    determining whether the cached system information is valid;
    using the cached system information for accessing the non-serving system if the cached system information is valid; and
    reading current system information broadcast by the non-serving system and using the current system information for accessing the non-serving system if the cached system information is not valid.

12. The method of claim 11, wherein determining whether the cached system information is valid comprises determining that the cached system information is valid if an elapsed time since a last reading of the system information is less than a particular threshold.

13. The method of claim 1, further comprising:
    reading at least one master information block broadcast by at least one candidate cell in the non-serving system prior to accessing the non-serving system;
    determining whether the cached system information has changed based on the at least one master information block; and
    using the cached system information to access the non-serving system if the cached system information has not changed.

14. The method of claim 1, further comprising:
    receiving, from the serving system, neighbor information indicative of at least one timing offset between a serving cell in the serving system and at least one neighbor cell in the at least one non-serving system, and wherein the reading system information comprises reading the system information broadcast by the at least one non-serving system based on the at least one timing offset.

15. The method of claim 1, further comprising:
receiving, from the serving system, neighbor information indicative of neighbor cells in the at least one non-serving system, or timing of the neighbor cells, or frequency of the neighbor cells, or a combination thereof, and wherein the reading system information comprises reading the system information broadcast by the at least one non-serving system based on the neighbor information.

16. The method of claim 1, wherein the accessing the non-serving system comprises:
determining at least one access parameter based on the cached system information; and
accessing the non-serving system based on the at least one access parameter.

17. The method of claim 1, wherein the accessing the non-serving system comprises:
detecting at least one neighbor cell in the at least one non-serving system;
identifying a candidate cell for access by the user equipment from among the at least one neighbor cell;
determining whether the cached system information is applicable for the candidate cell; and
accessing the candidate cell based on the cached system information if applicable for the candidate cell.

18. An apparatus for wireless communication, comprising:
a receive circuit and a transmit circuit configured to communicate with a serving system; and
a processor configured to read system information broadcast by at least one non-serving system prior to initiation of access to the at least one non-serving system, wherein the system information includes one or more access parameters needed by the apparatus to establish a connection with the at least one non-serving system; wherein
the processor is further configured to cache the system information broadcast by the at least one non-serving system prior to initiation of access to the at least one non-serving system;
the receive circuit is further configured to receive, from the serving system, neighbor information indicative of whether the system information broadcast by the at least one non-serving system has changed, wherein reading system information comprises reading the system information broadcast by the at least one non-serving system if the neighbor information indicates that the system information of the at least one non-serving system has changed; and
the processor is further configured to access a non-serving system among the at least one non-serving system using the cached system information.

19. The apparatus of claim 18, wherein the processor is further configured to read the system information broadcast by the at least one non-serving system during wake-up periods when the apparatus is in an idle mode and camping on the serving system, or during discontinuous reception periods when the apparatus is in a connected mode and actively communicating with the serving system, or both.

20. The apparatus of claim 18, wherein the processor is further configured to determine a periodicity of reading the system information broadcast by the at least one non-serving system based on speed of the apparatus, or radio conditions of cells in the at least one non-serving system, or a target standby time of the apparatus, or a combination thereof.

21. The apparatus of claim 18, wherein the processor is further configured to determine whether the cached system information is valid, to use the cached system information for accessing the non-serving system if the cached system information is valid, and to read current system information broadcast by the non-serving system and use the current system information for accessing the non-serving system if the cached system information is not valid.

22. The apparatus of claim 18, wherein the processor is further configured to read at least one master information block broadcast by at least one candidate cell in the non-serving system prior to accessing the non-serving system, to determine whether the cached system information has changed based on the at least one master information block, and to use the cached system information to access the non-serving system if the cached system information has not changed.

23. The apparatus of claim 18, wherein the receive circuit is further configured to receive, from the serving system, neighbor information indicative of neighbor cells in the at least one non-serving system, or timing of the neighbor cells, or frequency of the neighbor cells, or a combination thereof, and the processor is further configured to read the system information broadcast by the at least one non-serving system based on the neighbor information.

24. The apparatus of claim 18, wherein the processor is further configured to determine at least one access parameter based on the cached system information, and to access the non-serving system based on the at least one access parameter.

25. A non-transitory computer-readable medium storing computer executable code, comprising:
code for causing at least one computer to communicate with a serving system;
code for causing the at least one computer to read system information broadcast by at least one non-serving system prior to initiation of access to any of the at least one non-serving system, wherein the system information includes one or more access parameters needed by a user equipment to establish a connection with the at least one non-serving system;
code for causing the at least one computer to cache the system information broadcast by the at least one non-serving system prior to initiation of access to any of the at least one non-serving system;
code for receiving, from the serving system, neighbor information indicative of whether the system information broadcast by the at least one non-serving system has changed, wherein the code for reading system information comprises code for reading the system information broadcast by the at least one non-serving system when the neighbor information indicates that the system information of the at least one non-serving system has changed; and
code for causing the at least one computer to access a non-serving system among the at least one non-serving system based on the cached system information.

26. A method for wireless communication, comprising:
communicating with a user equipment in a first wireless system;
broadcasting, by the first wireless system, neighbor information related to at least one other wireless system, the neighbor information being usable by the user equipment to read system information broadcast by the at least one other wireless system prior to initiation of access to the at least one other wireless system, wherein the system information includes one or more access parameters needed by the user equipment to establish a connection with the at least one other wireless system; and providing, by the first wireless system, an indication to the user equipment that the content of the system information broadcast by the at least one other wireless system has changed.

27. The method of claim 26, wherein the first wireless system supports only packet switched services, and wherein the at least one other wireless system supports circuit switched services.

28. The method of claim 26,
wherein the neighbor information includes timing of the neighbor cells or at least one timing offset between a cell communicating with the user equipment and at least one neighbor cell, or a combination thereof.

29. An apparatus for wireless communication, comprising:
a receive circuit and a transmit circuit configured to communicate with a user equipment in a first wireless system, to broadcast, by the first wireless system, neighbor information related to at least one other wireless system, the neighbor information being usable by the user equipment to read system information broadcast by the at least one other wireless system prior to initiation of access to any of the at least one other wireless system, wherein the system information includes one or more access parameters needed by the user equipment to establish a connection with the at least one other wireless system, and a processor configured to provide, by the first wireless system, an indication to the user equipment that the content of the system information broadcast by the at least one other wireless system has changed.

30. The apparatus of claim 29, wherein the neighbor information includes timing of the neighbor cells, or at least one timing offset between a cell communicating with the user equipment and at least one neighbor cell, or a combination thereof.

31. A non-transitory computer-readable medium storing computer executable code, comprising:
code for causing at least one computer to communicate with a user equipment in a first wireless system;
code for causing the at least one computer to broadcast, by the first wireless system, neighbor information related to at least one other wireless system, the neighbor information being usable by the user equipment to read system information broadcast by the at least one other wireless system prior to initiation of access to any of the at least one other wireless system, and
code for causing the at least one computer to provide, by the first wireless system, an indication to the user equipment that the content of the system information broadcast by the at least one other wireless system has changed.

* * * * *